(12) United States Patent
Onishi et al.

(10) Patent No.: US 8,643,798 B2
(45) Date of Patent: Feb. 4, 2014

(54) ELECTRO-OPTIC DEVICE AND ELECTRONIC APPARATUS

(75) Inventors: Yasunori Onishi, Nagano (JP); Daisuke Nakanishi, Nagano (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 317 days.

(21) Appl. No.: 13/025,701

(22) Filed: Feb. 11, 2011

(65) Prior Publication Data
US 2012/0206682 A1    Aug. 16, 2012

(51) Int. Cl.
*G02F 1/1335*    (2006.01)

(52) U.S. Cl.
USPC .............................................. 349/40; 349/50

(58) Field of Classification Search
None
See application file for complete search history.

(56) References Cited

U.S. PATENT DOCUMENTS

| 6,525,786 B1 | 2/2003 | Ono | |
|---|---|---|---|
| 2005/0206796 A1* | 9/2005 | Okabe | 349/43 |
| 2010/0182529 A1* | 7/2010 | Nakanishi | 349/58 |

FOREIGN PATENT DOCUMENTS

JP    2001-147441    5/2001

* cited by examiner

*Primary Examiner* — Thanh-Nhan P Nguyen
(74) *Attorney, Agent, or Firm* — K&L Gates LLP

(57) ABSTRACT

An electro-optic device includes a first insulating substrate where a pixel electrode and a signal line are arranged on one surface side, a conductive layer formed on another surface of the first insulating substrate, and a conductive tape adhered to the conductive layer along at least one side of the first insulating substrate, where the conductive layer maintains a constant potential via the conductive tape.

8 Claims, 9 Drawing Sheets

ELECTRO-OPTIC DEVICE AND ELECTRONIC APPARATUS

CROSS-REFERENCES TO RELATED APPLICATIONS

The present application contains subject matter related to that disclosed in Japanese Priority Patent Application JP 2008-197473 filed in the Japan Patent Office on Jul. 31, 2008, the entire content of which is hereby incorporated by reference.

BACKGROUND

The present application relates to an electro-optic device where a pixel electrode and a signal line are arranged on one surface side of an insulating substrate and an electronic apparatus provided with the electro-optic device.

There are many electro-optic devices which have a configuration where a pixel electrode and a signal line are arranged on one surface side of an insulating substrate. In addition, in the electro-optic devices, there are many with configurations where an insulating member is overlapped and arranged on the other surface side of the insulating substrate. For example, in transparent-type and semi-transparent reflective-type liquid crystal devices which are typical electro-optic devices, insulating members such as a light guiding plate of a backlight device and various optical sheets are overlapped and arranged on a first insulating substrate as an element substrate or a second insulating substrate as an opposing substrate.

In such electro-optic devices, it is easy for faults to occur which are caused by static charge due to insulation of all of the element substrate, the opposing substrate, the light guiding plate, and the optical sheets having insulation properties. Therefore, a configuration is proposed where a thin antistatic conductive layer is formed on the entire surface or substantially the entire surface of the first insulating substrate (Japanese Unexamined Patent Application Publication No. 2001-147441).

In the configuration described in Japanese Unexamined Patent Application Publication No. 2001-147441, in an edge portion of the first insulating substrate, one end of a conductive cable is attached to an antistatic conductive layer using an anisotropic conductive tape and another end of the conductive cable is electrically connected to a ground pattern of a circuit substrate.

SUMMARY

However, since the antistatic conductive layer formed on the insulating substrate is extremely thin and sheet resistance is high, it is difficult to resolve static charge in the insulating substrate by just connecting the conductive cable by a small anisotropic conductive tape.

In addition, when a common potential with a predetermined frequency is applied to a common electrode formed on the element substrate or the opposing substrate, the light guiding plate, the various optical sheets and the like which are overlapped and arranged on the element substrate or the opposing substrate are statically charged and high-frequency noise may be generated. To resolve this phenomenon, it is necessary to form the antistatic conductive layer on a rear surface side where the light guiding plate and the various optical sheets are positioned in the element substrate or the opposing substrate, but there are significant limits in terms of space when applying a ground potential to the conductive layer and there is a problem in that it is not possible for the conductive cable and the circuit substrate to be arranged closely.

It is desirable to provide an electro-optic device and electronic apparatus which are able to reliably maintain an antistatic conductive layer formed on an insulating substrate at a constant potential in a narrow space.

It is also desirable to provide an electro-optic device and electronic apparatus which are able to reliably maintain an antistatic conductive layer formed on an insulating substrate at a constant potential in a narrow space without adding new members.

An electro-optic device according to an embodiment is provided with a first insulating substrate where a pixel electrode and a signal line are arranged on one surface side, a conductive layer formed on another surface of the first insulating substrate, and a conductive tape adhered to the conductive layer along at least one side of the first insulating substrate, where the conductive layer maintains a constant potential via the conductive tape.

As described herein and according to an embodiment, an "electro-optic device" has the meaning of a device which modulates light based on an electric signal such as a liquid crystal device or an organic electroluminescent device, or a device which converts a light signal into an electric signal such as an image sensor.

In an embodiment, for charging of the first insulating substrate to be prevented, an antistatic conductive layer is formed on the entire surface or substantially the entire surface of a rear surface of the first insulating substrate (a side opposite to the side where the pixel electrode and the signal line are arranged), and the conductive layer maintains a constant potential via the conductive tape adhered to the conductive layer along at least one side of the first insulating substrate. As a result, even in a case where the sheet resistance of the conductive layer is high, since the conductive tape is adhered over a wide range of the conductive layer, it is possible to reliably maintain the constant potential in the entire conductive layer. As a result, it is possible to reliably prevent charging of the first insulating substrate.

In a case where the present application is applied to a liquid crystal device, the liquid crystal device is provided with a second insulating substrate which is arranged to face the one surface side of the first insulating substrate, liquid crystal held between the first insulating substrate and the second insulating substrate, and a insulating member arranged on the other surface side of the first insulating substrate, where the insulating member includes a light guiding plate of a backlight device and an optical sheet arranged between the light guiding plate and the first insulating substrate. In the liquid crystal device, since the charging of the first insulating substrate is prevented due to the conductive layer and the conductive tape, there is no charging of the insulating member.

An electro-optic device according to an embodiment is further provided with a support body which supports the first insulating substrate, where the conductive tape is a double-sided tape where a conductive adhesion layer is formed on at least one surface, and it is possible to adopt a configuration where the first insulating substrate and the support body are fixed. With such a configuration, since the constant potential is maintained in the conductive layer using the double-sided tape which performs fixing of the first insulating substrate and the support body, it is not necessary to add new members (tape).

In an electro-optic device according to an embodiment, it is possible to adopt a configuration where the support body includes a metallic case and the conductive tape is adhered to the metallic case. With such a configuration, it is sufficient to adhere the conductive tape to the metallic case as it is and it is not necessary to use a conductive cable or the like. For this reason, it is possible to improve operational efficiency and it is possible to achieve a reduction in the number of components.

In an electro-optic device according to an embodiment, it is preferable if the conductive tape is adhered along at least the one side of the first insulating substrate and another side of the first insulating substrate. With such a configuration, since the conductive tape is adhered over a wide range of the conductive layer, it is possible to reliably maintain the constant potential in the entire conductive layer.

In an electro-optic device according to an embodiment, it is preferable if the one side and the other side are adjacent, and the conductive tape along the one side and the conductive tape along the other side are separated. With such a configuration, it is sufficient to adhere a short strip of the conductive tape with regard to each of the two sides, and it is not necessary to use the conductive tape with a shape bend along the two adjacent sides. For this reason, adhering of the conductive tape is easy.

In an electro-optic device according to an embodiment, a configuration may be adopted where a wiring substrate connected to the first insulating substrate is also provided, a ground pattern is formed in the wiring substrate, and the conductive tape is adhered to the ground pattern. With such a configuration, it is sufficient to adhere the conductive tape to the wiring substrate as it is and it is not necessary to use a conductive cable or the like. For this reason, it is possible to improve operational efficiency and it is possible to achieve a reduction in the number of components.

The electro-optic device according to an embodiment may be used in electronic apparatuses such as a portable computer, a mobile phone, a car navigation system, and a personal computer.

Additional features and advantages are described herein, and will be apparent from the following Detailed Description and the figures.

DETAILED DESCRIPTION

The present application will be described with reference to the diagram according to an embodiment. In addition, in the diagrams referred to in the description below, since each layer and each member in the diagrams is set to a size so as to be recognizable visually, the reduction scale will differ for each layer and each member.

First Embodiment (Overall Configuration of Electro-Optic Device)

Figure 1:
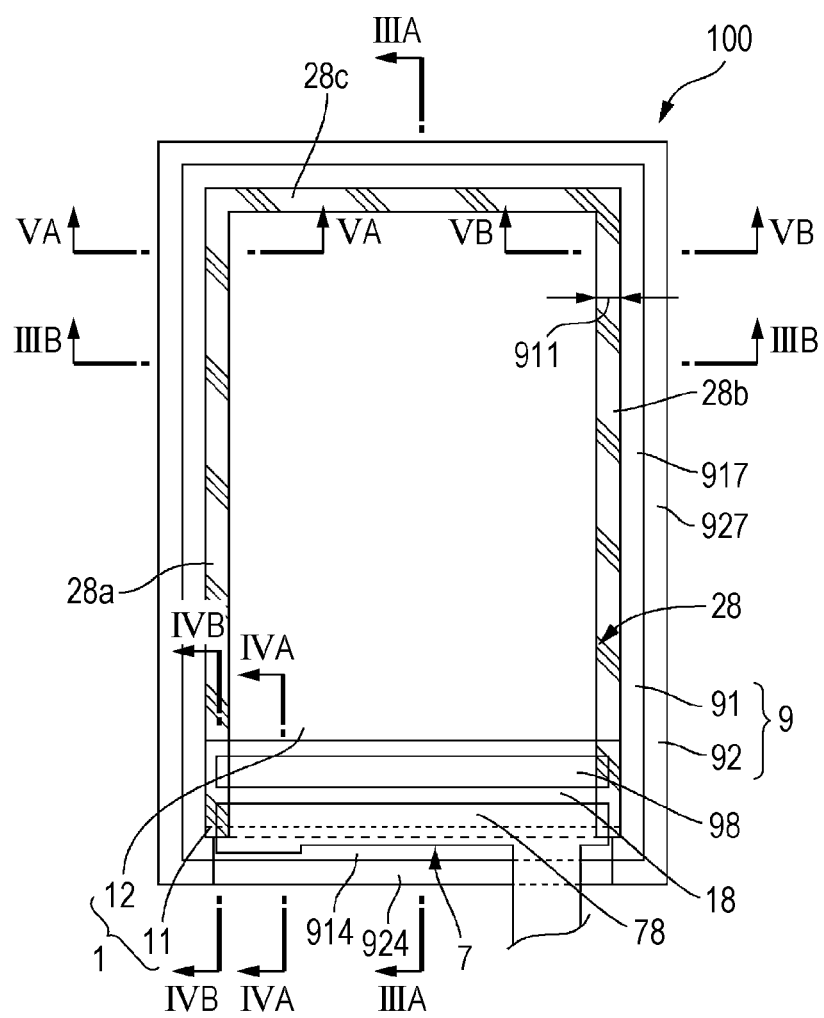
FIG. 1 is a planar diagram of an electro-optic device according to a first embodiment.
Figure 2:
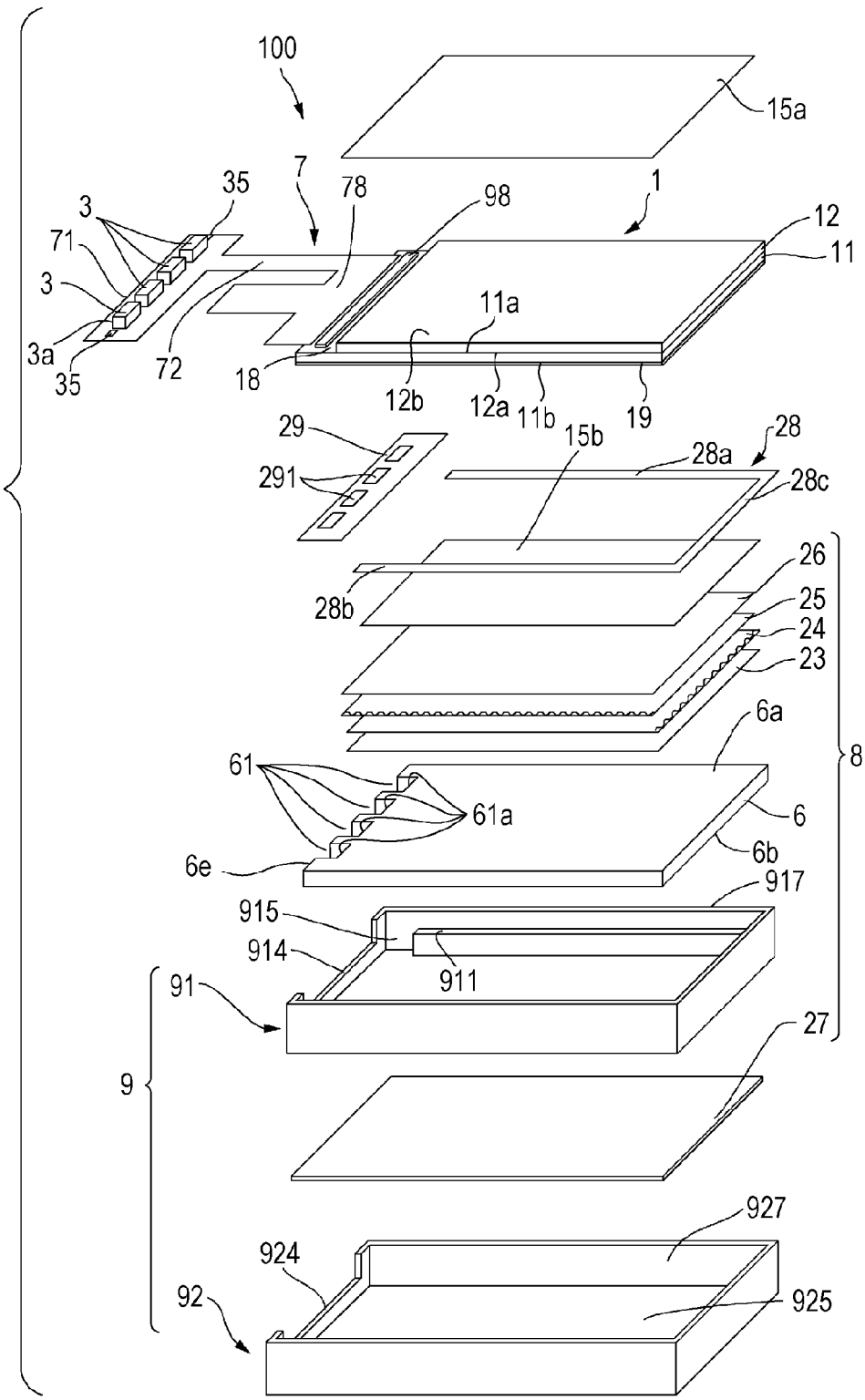
FIG. 2 is an exploded perspective diagram of the electro-optic device according to the first embodiment.
Figure 3A:
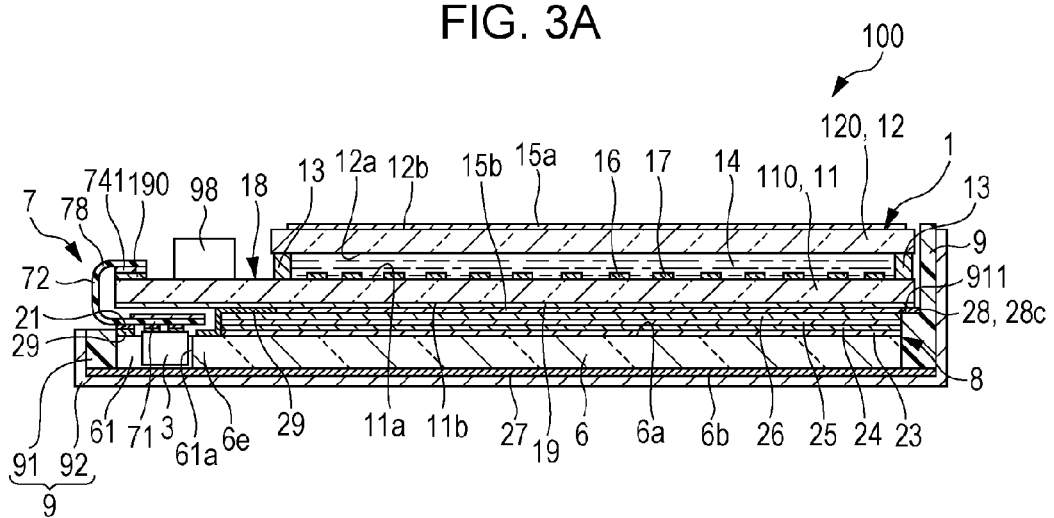
FIGS. 3A and 3B are respectively cross-sectional diagrams schematically illustrating appearances when the electro-optic device according to the first embodiment is cut at positions equivalent to the line IIIA-IIIA and the line IIIB-IIIB of FIG. 1.
Figure 3B:
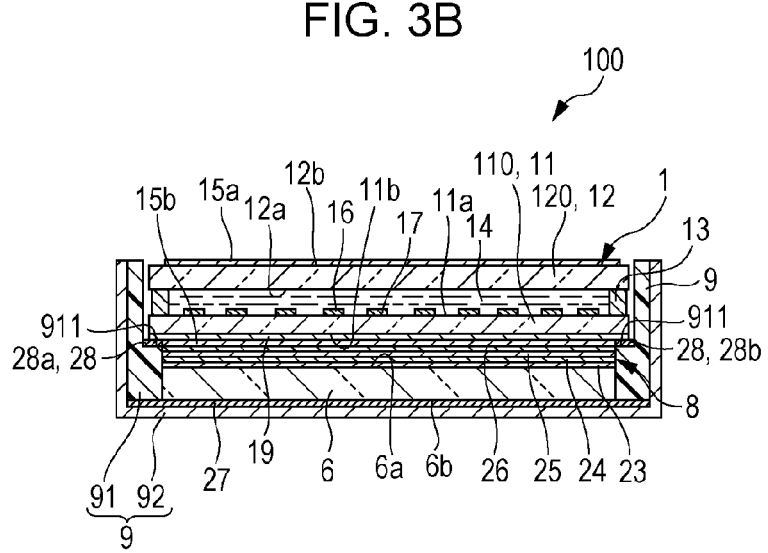
Figure 4A:
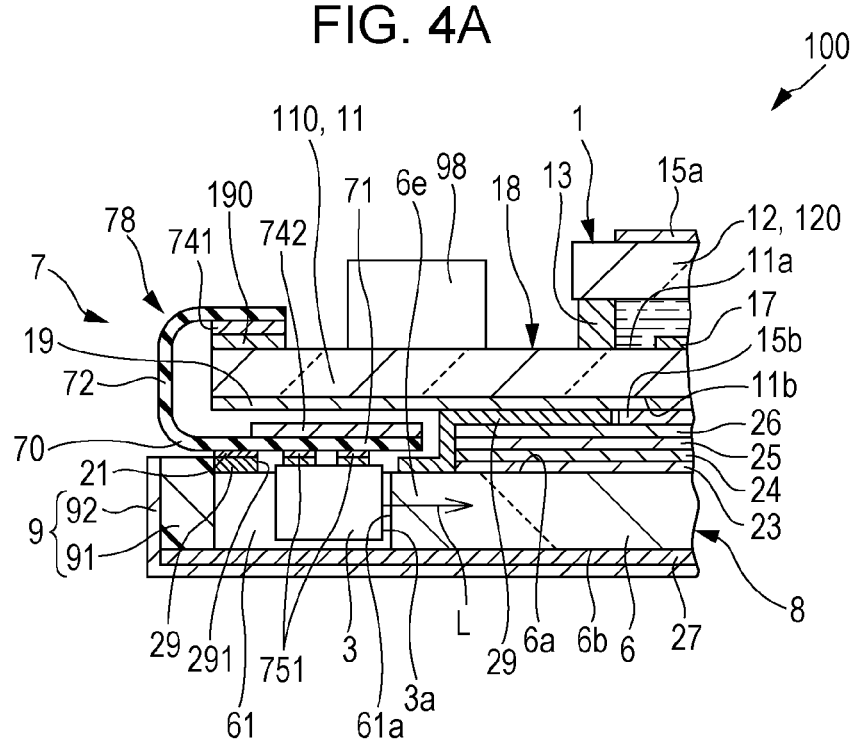
FIGS. 4A and 4B are respectively cross-sectional diagrams schematically illustrating appearances when the electro-optic device according to the first embodiment is cut at positions equivalent to the line IVA-IVA and the line IVB-IVB of FIG. 1.
Figure 4B:
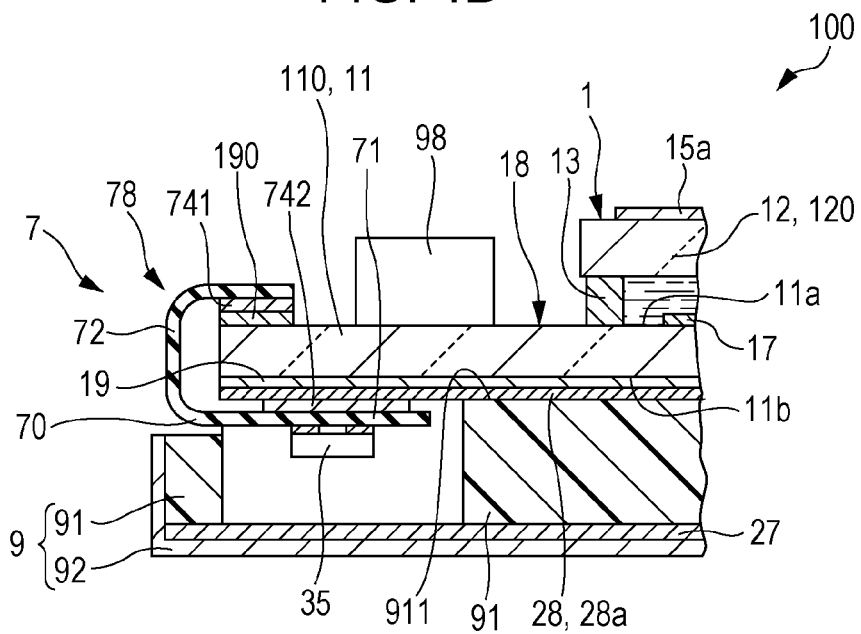

FIGS. 1 and 2 are respectively a planar diagram and an exploded perspective diagram of an electro-optic device according to a first embodiment. FIGS. 3A and 3B are respectively cross-sectional diagrams schematically illustrating appearances when the electro-optic device according to the first embodiment is cut at positions equivalent to the line IIIA-IIIA and the line IIIB-IIIB of FIG. 1. FIGS. 4A and 4B are respectively cross-sectional diagrams schematically illustrating appearances when the electro-optic device according to the first embodiment is cut at positions equivalent to the line IVA-IVA and the line IVB-IVB of FIG. 1. In addition, in FIG. 1, the adhering range of the conductive tape described later is shown as a region with sets of three right downward diagonal lines.

As shown in FIGS. 1 and 2, an electro-optic device 100 (liquid crystal device) of the embodiment has a transparent-type and semi-transparent reflective-type liquid crystal panel 1 and an illumination device 8 arranged on a rear surface side of the liquid crystal panel 1, and the illumination device 8 and the liquid crystal panel 1 are supported by a support body 9. The support body 9 is formed from a resin case 91 with a rectangular frame shape and a metallic case 92 with a box shape which supports the resin case 91 from the outside. In the resin case 91, out of four side board portions 917, a notch 914 is formed in one side board portion 917, which is positioned on a drawing-out side of a flexible substrate 7 as a wiring substrate, and in inner sides of the remaining three side board portions 917, a step portion 911 is formed which receives an upper surface of the liquid crystal panel 1. In the resin case 91, in the vicinity of the side board portion 917 which is positioned on the drawing-out side of the flexible substrate 7, there is a cut-out portion 915 of the step portion 911 and the step portion 911 is not formed. The metallic case 92 is provided with a bottom board portion 925 with a rectangular shape and four side board portions 927 which stand up from the outer edges of the bottom board portion 925, and a notch 924 is formed in one side board portion 927 which is positioned on the drawing-out side of the flexible substrate 7. The metallic case 92 maintains a ground potential.

The liquid crystal panel 1 is provided with a element substrate 11, an opposing substrate 12 arranged to face a first surface 11a (one surface) of the element substrate 11, and a sealing material 13 with a rectangular frame shape which adheres the element substrate 11 and the opposing substrate 12 at a substrate outer edge. A liquid crystal 14 is held as an electro-optic substance in a space formed by the element substrate 11, the opposing substrate 12, and the sealing material 13. Also, the element substrate 11 is provided with a drawing-out region 18 which protrudes out further than the edge portion of the opposing substrate 12. In the embodiment, the element substrate 11 and the opposing substrate 12 are transparent insulating substrates 110 and 120 where both of the substrates are glass or the like.

On the first surface 11a of the element substrate 11 which faces the opposing substrate 12, a pixel electrode 16 with an island shape which is formed from an ITO (Indium Tin Oxide) film or an IZO (Indium Zinc Oxide) film, signal lines (not shown) such as a pixel switching element, a scanning line or a data line, and the like are formed, and an orientation film (not shown) formed from polyimide or the like is formed so as to cover the pixel electrode 16.

In the embodiment, the liquid crystal panel 1 is a liquid crystal panel of an In Plane Switching (referred to below as IPS) method or a Fringe Field Switching (referred to below as FFS) method, and the liquid crystal 14 is driven by a horizontal electric field. Accordingly, in the element substrate 11, a common electrode 17 is also formed from an ITO film or an IZO film. As a result, the common electrode 17 is not formed in a first surface 12a of the opposing substrate 12 which faces the element substrate 11. In addition, in the first surface 12a of the opposing substrate 12, a color filter (not shown) and the like may be formed.

In the case of the IPS method, a configuration is adopted where the pixel electrode 16 and the common electrode 17 face each other in the horizontal direction. In the case of the FFS method, a configuration is adopted where the pixel electrode 16 and the common electrode 17 are formed in different layers in an up/down direction and interpose a conductor film. However, in the diagrams referenced in the embodiment, even in the case of the FFS method, the pixel electrode 16 and the common electrode 17 are schematically shown as facing each other in the horizontal direction in the same manner as the IPS method.

In the liquid crystal panel 1, in the opposing substrate 12, an upper-side polarization plate 15a is overlapped and arranged on a second surface 12b on a side opposite to the first surface 12a which faces the element substrate 11, and in the element substrate 11, and a lower-side polarization plate 15b is overlapped and arranged on a second surface 11b (other surface of the element substrate 11) on a side opposite to the first surface 11a which faces the opposing substrate 12.

In the electro-optical device 100 configured in this manner, light which exits from the illumination device 8 irradiates from the element substrate 11 side, the incident light is optically modulated and exits from the opposing substrate 12 side, and an image is displayed.

As shown in FIGS. 1 to 3B, in the drawing-out region 18 of the element substrate 11, a driving IC 98 is mounted using an anisotropic conductive film or the like, and in a terminal 190 formed in an edge portion of the drawing-out region 18, a terminal 741, which is formed in a main body portion 78 of the flexible substrate 7, is connected. As a result, it is possible to input various signals or power sources which are externally supplied to the liquid crystal panel 1 via the flexible substrate 7.

In the flexible substrate 7, a strip portion 72 extends from the main body portion 78, and at the tip portion of the strip portion 72, a light source mounting portion 71, whose longitudinal direction is toward the width direction of the liquid crystal panel 1, is formed. In the light source mounting portion 71, a light source mounting terminal 751 is formed, and in the light source mounting terminal 751, a point light source 3 of the illumination device 8 is mounted. Accordingly, in the point light source 3, a light source driving voltage is supplied via the flexible substrate 7. In addition, in a surface side of the flexible substrate 7 where the point light source 3 is mounted, an electronic part 35 such as a surface mounted capacitor is also mounted.

The flexible substrate 7 is a multi-layer substrate or a two-sided substrate. When viewing from a side opposite to the side where the light source mounting portion 71 and the point light source 3 are mounted, a conductive pattern 742 is formed with an insulating layer 70 such as a polyimide layer in between the conductive pattern 742 and the light source mounting terminal 751 in a region which overlaps with the light source mounting terminal 751 in a planar view. The conductive pattern 742 is a ground pattern with no gaps and is formed on a surface over a predetermined region with no gaps. As a result, the conductive pattern 742 is used for light shielding, electromagnetic shielding, and releasing heat with regard to the point light source 3. In the flexible substrate 7, the conductive pattern 742 and the terminal 741 are formed on one surface side of the insulating layer 70 formed from a film substrate of the flexible substrate 7, and the light source mounting terminal 751 is formed on another surface side of the insulating layer 70. In the embodiment, the point light source 3 is a surface mounted white LED, and with regard to the surface of the light source mounting portion 71 of the flexible substrate 7, and a plurality of the point light sources 3 are mounted at predetermined intervals in a parallel direction toward an exiting light axis L.

(Overall Configuration of Illumination Device 8)

The illumination device 8 has a light guiding plate 6 with a substantially rectangular shape which faces a first surface 6a which is a light emitting surface to the element substrate 11 of the liquid crystal panel 1 and the plurality of point light sources 3 formed from white LEDs arranged along a edge portion 6e of the light guiding plate 6. Furthermore, the illumination device 8 has a reflective sheet 27 which is overlapped and arranged on a second surface 6b which is a side opposite to the first surface 6a in the light guiding plate 6 and a plurality of optical sheets which are overlapped and arranged on the first surface 6a of the light guiding plate 6. In the embodiment, as the plurality of optical sheets, a scattering plate 23 with a rectangular shape, a prism sheet 24 with a rectangular shape, a prism sheet 25 with a rectangular shape, and a scattering plate 26 with a rectangular shape are overlapped and arranged in order from the light guiding plate 6 toward the liquid crystal panel 1. The light guiding plate 6 is for uniformly illuminating light which exits from the point light source 3 within the surface of the liquid crystal panel 1 and is formed from a transparent material such as acrylic resin, polycarbonate or the like. The scattering plates 23 and 26 are for making the brightness of the light within the screen of the liquid crystal panel 1 more uniform. The prism sheets 24 and 25 are for adjusting the orientation angle of the exiting light and for improving the brightness of the front surface.

In the edge portion 6e of the light guiding plate 6, a light source positioning hole 61 with a notch shape is formed in predetermined intervals along the side, and one of the inner walls becomes a light incident portion 61a where light which exits from the point light source 3 is incident. Accordingly, in the flexible substrate 7, a strip portion 72 is bent so that a surface, which is on the side where the point light source 3 of the light source mounting portion 71 is mounted, faces downward, and in the edge portion 6e of the light guiding plate 6, when the light source mounting portion 71 is overlapped on the first surface 6a side, the plurality of point light sources 3 are each arranged in the light source positioning holes 61 so that a light emitting surface 3a faces the light incident portion 61a. At this time, along the edge portion 6e of the light guiding plate 6, a light shielding sheet 29, which is formed with an adhesive layer on a lower surface, is adhered and on an upper surface of the light shielding sheet 29, a double-sided tape 21 is arranged. As a result, the light source mounting portion 71 of the flexible substrate 7 is fixed to the edge portion 6e of the light guiding plate 6 via the double-sided tape 21 and the light shielding sheet 29. In the light shielding sheet 29, an opening portion 291 with a rectangular shape is formed in a position which overlaps with the light source positioning holes 61 of the light guiding plate 6 in a planar view. Accordingly, when the light source mounting portion 71 of the flexible substrate 7 is overlapped on the light shielding sheet 29, the plurality of the point light sources 3 are respectively arranged in the light source positioning holes 61 via the opening portion 291.

(Measures Against Static Charge)

Figure 5A:
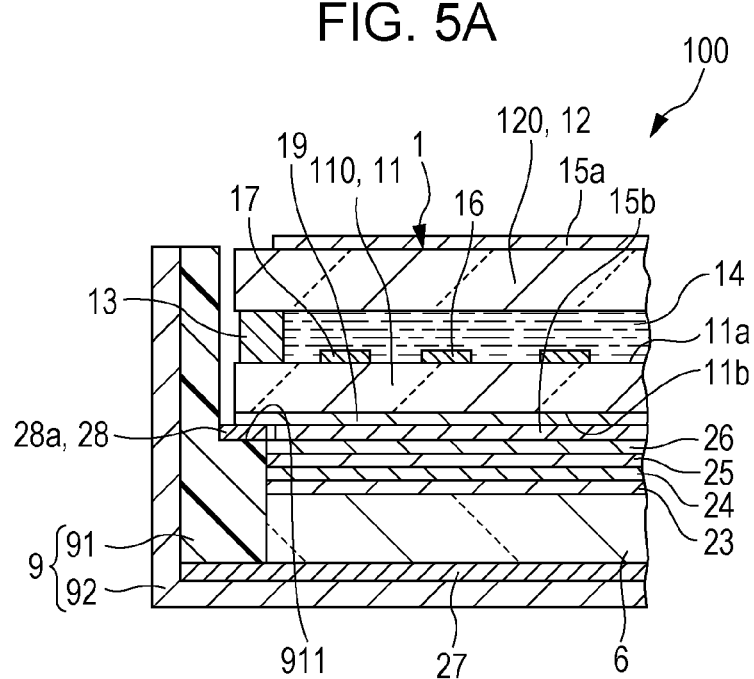
FIGS. 5A and 5B are respectively cross-sectional diagrams schematically illustrating appearances when the electro-optic device according to the first embodiment is cut at positions equivalent to the line VA-VA and the line VB-VB of FIG. 1.
Figure 5B:
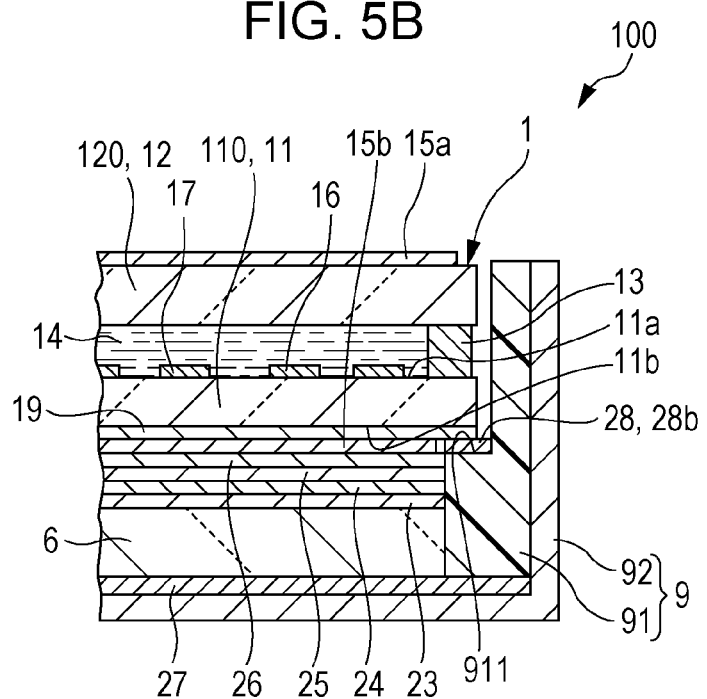

FIGS. 5A and 5B are respectively cross-sectional diagrams schematically illustrating appearances when the electro-optic device according to the first embodiment is cut at positions equivalent to the line VA-VA and the line VB-VB of FIG. 1.

As described with reference to FIGS. 1 to 4B, in the electro-optic device 100 of the embodiment, the element substrate 11 and the opposing substrate 12 are formed from the insulating substrates 110 and 120 where both of the substrates are transparent. In addition, the lower-side polarization plate 15b arranged on the second surface 11b of the element substrate 11, the optical sheets such as the scattering plate 26, the prism sheet 25, the prism sheet 24, the scattering plate 23, and the light guiding plate 6 are insulating members. As a result, it is easy for any of the element substrate 11, the lower-side polarization plate 15b, the scattering plate 26, the prism sheet 25, the prism sheet 24, the scattering plate 23, and the light guiding plate 6 to be statically charged. Furthermore, in order to perform reverse driving in the electro-optic device 100, when a signal with a predetermined frequency is applied to the common electrode 17 formed on the element substrate 11, the static charge state of the element substrate 11, the lower-side polarization plate 15b, the scattering plate 26, the prism sheet 25, the prism sheet 24, the scattering plate 23, and the light guiding plate 6 changes in the same manner as the potential of the common electrode 17. Here, since the element substrate 11 is adhered to the opposing substrate 12 and the lower-side polarization plate 15b is adhered to the element substrate 11, even if the static charge state changes periodically, there is no oscillation. On the other hand, since not in an adhered state, the scattering plate 26, the prism sheet 25, the prism sheet 24, the scattering plate 23, and the light guiding plate 6 oscillate. Furthermore, when the oscillation is in an audible range of 10 to 25 kHz, there is high-frequency noise.

Therefore, in the embodiment, as shown in FIGS. 2 to 4B, a rear-surface-side conductive layer 19 is formed from a conductive transparent film such as an ITO film over the entire surface or substantially the entire surface in the second surface 11b of the element substrate 11 as an antistatic conductive layer. In addition, in the second surface 11b of the element substrate 11, the conductive tape 28 is adhered along three sides of the element substrate 11 with regard to the rear-surface-side conductive layer 19.

The conductive tape 28 is a double-sided tape formed with a conductive adhesive layer formed on both sides of a metallic film, one surface is adhered to the rear-surface-side conductive layer 19 formed on the second surface 11b of the element substrate 11 and is adhered to the conductive pattern 742 (ground pattern), which is formed in the light source mounting portion 71 of the flexible substrate 7, at a rear surface side of the drawing-out region 18 of the element substrate 11. As a result, since the rear-surface-side conductive layer 19 formed on the second surface 11b of the element substrate 11 normally maintains a ground potential (constant potential), the insulating substrate 110 which is a base of the element substrate 11, the lower-side polarization plate 15b, the scattering plate 26, the prism sheet 25, the prism sheet 24, the scattering plate 23, and the light guiding plate 6 are not statically charged.

In the conductive tape 28, for example, as a conductive adhesive layer, a layer is used where conductive particle bodies such as copper, nickel, an alloy of copper and nickel, carbon, or the like are dispersed in an adhesive, and as a metallic film, a film made of a metal such as copper, nickel, stainless steel, aluminium, an alloy of the metals, or the like is used.

As shown in FIGS. 4B to 5B, the conductive tape 28 also carries out the function of fixing the element substrate 11 to the resin case 91. That is, one surface of the conductive tape 28 is adhered to the rear-surface-side conductive layer 19 formed on the second surface 11b of the element substrate 11, and another surface of the conductive tape 28 is adhered to an upper surface of the step portion 911 formed on an inner side of the resin case 91.

In the embodiment, in the second surface 11b of the element substrate 11 as shown in FIGS. 1 and 2, the conductive tape 28 is formed in three strip-shaped portions 28a, 28b, and 28c along three sides excluding one edge portion where the drawing-out region 18 is positioned, and the adjacent strip-shaped portions 28a and 28c and the adjacent strip-shaped portions 28b and 28c are connected. As a result, the conductive tape 28 becomes one piece of tape where the strip-shaped portions 28a, 28b, and 28c are integrally connected.

Here, it is necessary for the rear-surface-side conductive layer 19 of the element substrate 11 and the conductive tape 28 to be in direct contact and for the lower-side polarization plate 15b to be adhered in the second surface 11b of the element substrate 11. Therefore, the lower-side polarization plate 15b is set to a size of which is possible to be arranged within a region surrounded by the conductive tape 28, and the conductive tape 28 is arranged to surround the outside of the lower-side polarization plate 15b in the second surface 11b of the element substrate 11.

(Assembly Method of Electro-Optic Device 100)

In the assembly of the electro-optic device 100, first, the upper-side polarization plate 15a and the lower-side polarization plate 15b are adhered to both surfaces of the liquid crystal panel 1.

In addition, after the light guiding plate 6 and the optical sheets (the scattering plates 23 and 26 and the prism sheets 24 and 25) are laminated in an inner side of the resin case 91, a light shielding sheet 29 is overlapped as so as cover the edge portion 6e of the light guiding plate 6. Next, the double-sided tape 21 is adhered on the light shielding sheet 29. Next, in the flexible substrate 7, the strip portion 72 is bent so that the surface, which is on the side where the point light source 3 of the light source mounting portion 71 is mounted, faces downward, and the light source mounting portion 71 is overlapped on the first surface 6a in the edge portion 6e of the light guiding plate 6. Then, the light source mounting portion 71 is pressed against the double-sided tape 21 and the light source mounting portion 71 is fixed to the edge portion 6e of the light guiding plate 6 via the double-sided tape 21 and the light shielding sheet 29.

As a result, since the illumination device 8 is completed, if the liquid crystal panel 1 with the upper-side polarization plate 15a and the lower-side polarization plate 15b adhered to both surfaces is overlapped on top, there is a state where the illumination device 8 and the liquid crystal panel 1 are supported by the resin case 91. Accordingly, if the resin case 91 is accommodated in an inner side of the metallic case 92, the assembly of the electro-optic device 100 is complete. At this time, the conductive tape 28 is adhered to the upper surface of the step portion 911 of the resin case 91 and the edge portion of the conductive tape 28 is adhered to the conductive pattern 742 of the flexible substrate 7. Then, if the liquid crystal panel 1 is placed on the upper surface of the step portion 911 of the resin case 91, the conductive tape 28 is adhered to the rear-surface-side conductive layer 19 formed on the second surface 11b of the element substrate 11 in the liquid crystal panel 1.

(Main Effects of the Embodiment)

As described above, in the embodiment, for preventing charging of the insulating members (the lower-side polarization plate 15b, the scattering plate 26, the prism sheet 25, the prism sheet 24, the scattering plate 23, and the light guiding plate 6) which are overlapped and arranged on the second surface 11b of the element substrate 11 (rear surface side of the insulating substrate 110), first, the antistatic rear-surface-side conductive layer 19 is formed on the entire surface or substantially the entire surface of the second surface 11b of the element substrate 11 (rear surface side of the insulating substrate 110). In addition, the rear-surface-side conductive layer 19 maintains the ground potential (constant potential) via the conductive tape 28 adhered to the rear-surface-side conductive layer 19 along the three sides of the insulating substrate 110. As a result, even in a case when the sheet resistance of the rear-surface-side conductive layer 19 is high, since the conductive tape 28 is adhered over a wide range of the rear-surface-side conductive layer 19, it is possible to reliably maintain the constant potential in the entire rear-surface-side conductive layer 19. Accordingly, it is possible to reliably prevent the charging of the insulating substrate 110 and the insulating members (the lower-side polarization plate 15b, the scattering plate 26, the prism sheet 25, the prism sheet 24, the scattering plate 23, and the light guiding plate 6). For this reason, when a common potential with a predetermined frequency is applied to the common electrode 17 formed on the element substrate 11 and reverse driving is performed, since there is no charging and oscillating of the insulating members (the lower-side polarization plate 15b, the scattering plate 26, the prism sheet 25, the prism sheet 24, the scattering plate 23, and the light guiding plate 6) which are overlapped and arranged on the element substrate 11, it is possible to reliably prevent the generation of high-frequency noise.

In addition, in the embodiment, since the conductive tape 28 is directly adhered to the conductive pattern 742 of the flexible substrate 7, it is possible for the rear-surface-side conductive layer 19 in a narrow space to maintain the ground potential and it is not necessary to use a dedicated conductive cable.

Furthermore, the conductive tape 28 is double-sided tape with a conductive adhesive layer formed on both surfaces and is used in the fixing of the element substrate 11 (the insulating substrate 110) and the supporting body 9 (the resin case 91). In other words, it is a configuration where the conductive tape 28 has been changed to double-sided tape used in the fixing of the element substrate 11 (the insulating substrate 110) and the supporting body 9 (the resin case 91). For this reason, it is absolutely not necessary to add new members.

Second Embodiment

Figure 6:
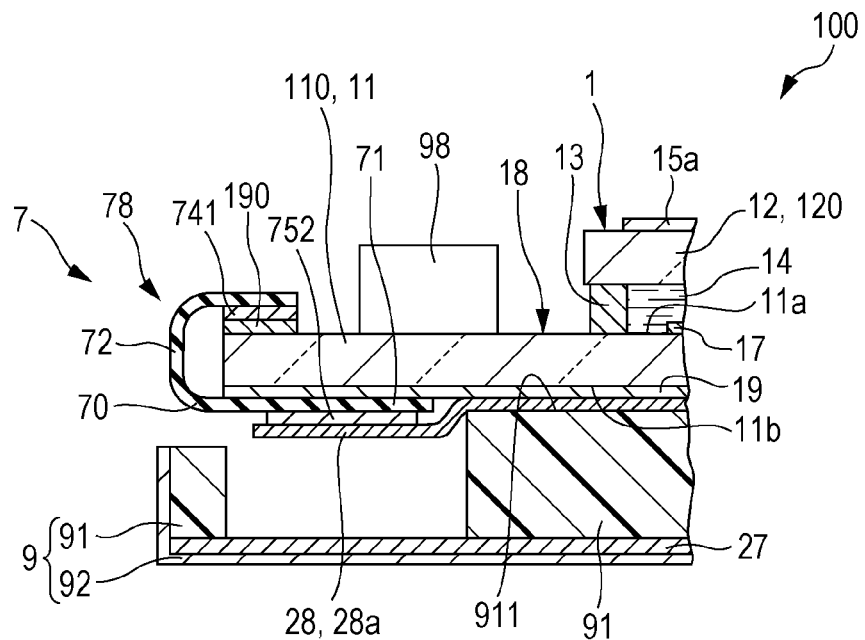
FIG. 6 is a cross-sectional diagram illustrating a connection structure of a conductive tape and a flexible substrate in an electro-optic device according to a second embodiment.

FIG. 6 is a cross-sectional diagram illustrating a connection structure of the conductive tape 28 and the flexible substrate 7 in an electro-optic device according to a second embodiment, and is equivalent to a cross-sectional diagram when the electro-optic device is cut at a position equivalent to the line IVB-IVB' of FIG. 1. In addition, since the basic configuration of the embodiment is the same as the first embodiment, the same reference numerals are attached to common parts in the diagrams and descriptions thereof will be omitted.

As shown in FIG. 6, also in the electro-optic device 100 of the embodiment, the rear-surface-side conductive layer 19, which is formed from a conductive transparent film such as an ITO film, is formed on the entire surface or substantially the entire surface of the second surface 11b of the element substrate 11 as the antistatic conductive layer. In addition, in the second surface 11b of the element substrate 11, the conductive tape 28 is adhered along three sides of the element substrate 11 with regard to the rear-surface-side conductive layer 19. Also in the embodiment, the conductive tape 28 is double-sided tape with a conductive adhesive layer formed on both surfaces of a metallic film and one surface is adhered to the rear-surface-side conductive layer 19 formed on the second surface 11b of the element substrate 11.

Here, in the light source mounting portion 71 of the flexible substrate 7, a conductive pattern 752 (ground pattern) is formed in the same surface side as the surface where the point light source 3 which is described with reference to FIGS. 3A to 4A is mounted and one surface of the conductive tape 28 is adhered to the conductive pattern 752.

In addition, in the same manner as the first embodiment, the conductive tape 28 also carries out the function of fixing the element substrate 11 to the resin case 91, and the other surface of the conductive tape 28 is also adhered to the upper surface of the step portion 911 formed on an inner side of the resin case 91. Since the other configurations are the same as the first embodiment, descriptions thereof will be omitted.

Even in the case of such a configuration, the antistatic rear-surface-side conductive layer 19, which is formed on the entire surface or substantially the entire surface of the second surface 11b of the element substrate 11 (rear surface side of the insulating substrate 110), maintains the ground potential (constant potential) via the conductive tape 28 adhered to the rear-surface-side conductive layer 19 along the three side of the insulating substrate 110. As a result, even in a case when the sheet resistance of the rear-surface-side conductive layer 19 is high, since the conductive tape 28 is adhered over a wide range of the rear-surface-side conductive layer 19, it is possible to reliably maintain the constant potential in the entire rear-surface-side conductive layer 19. Accordingly, it is possible to reliably prevent the charging of the insulating substrate 110 and the insulating members (the lower-side polarization plate 15b, the scattering plate 26, the prism sheet 25, the prism sheet 24, the scattering plate 23, and the light guiding plate 6). For this reason, even in a case where a common potential with a predetermined frequency is applied to the common electrode 17, since there is no charging and oscillating of the insulating members (the lower-side polarization plate 15b, the scattering plate 26, the prism sheet 25, the prism sheet 24, the scattering plate 23, and the light guiding plate 6), similar effects to the first embodiment are realized such as it being possible to reliably prevent the generation of high-frequency noise.

Third Embodiment

Figure 7:
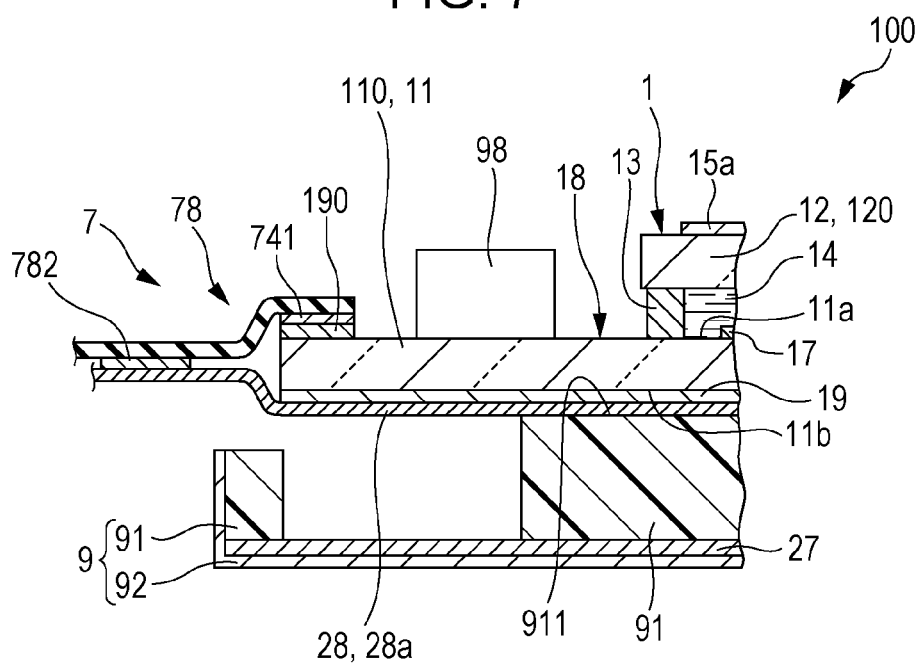
FIG. 7 is a cross-sectional diagram illustrating a connection structure of a conductive tape and a flexible substrate in an electro-optic device according to a third embodiment.

FIG. 7 is a cross-sectional diagram illustrating a connection structure of the conductive tape 28 and the flexible substrate 7 in an electro-optic device according to a third embodiment, and is equivalent to a cross-sectional diagram when the electro-optic device is cut at a position equivalent to the line IVB-IVB' of FIG. 1. In addition, since the basic configuration of the embodiment is the same as the first embodiment, the same reference numerals are attached to common parts in the diagrams and descriptions thereof will be omitted.

As shown in FIG. 7, also in the electro-optic device 100 of the embodiment, the rear-surface-side conductive layer 19, which is formed from a conductive transparent film such as an ITO film, is formed on the entire surface or substantially the entire surface of the second surface 11b of the element substrate 11 as the antistatic conductive layer. In addition, in the second surface 11b of the element substrate 11, the conductive tape 28 is adhered along three sides of the element substrate 11 with regard to the rear-surface-side conductive layer 19. Also in the embodiment, the conductive tape 28 is double-sided tape with a conductive adhesive layer formed on both surfaces of a metallic film and one surface is adhered to the rear-surface-side conductive layer 19 formed on the second surface 11b of the element substrate 11.

Here, in the main body portion 78 of the flexible substrate 7, a conductive pattern 782 (ground pattern) is formed on the same surface side as the terminal 741 and the conductive pattern 782 is adhered to one surface of the conductive tape 28.

In addition, in the same manner as the first embodiment, the conductive tape 28 also carries out the function of fixing the element substrate 11 to the resin case 91, and the other surface of the conductive tape 28 is also adhered to the upper surface of the step portion 911 formed on an inner side of the resin case 91. Since the other configurations are the same as the first embodiment, descriptions thereof will be omitted.

Even in the case of such a configuration, the antistatic rear-surface-side conductive layer 19, which is formed on the entire surface or substantially the entire surface of the second surface 11b of the element substrate 11 (rear surface side of the insulating substrate 110), maintains the ground potential (constant potential) via the conductive tape 28 adhered to the rear-surface-side conductive layer 19 along the three side of the insulating substrate 110. As a result, even in a case when the sheet resistance of the rear-surface-side conductive layer 19 is high, since the conductive tape 28 is adhered over a wide range of the rear-surface-side conductive layer 19, it is possible to reliably maintain the constant potential in the entire rear-surface-side conductive layer 19. Accordingly, it is possible to reliably prevent the charging of the insulating substrate 110 and the insulating members (the lower-side polarization plate 15b, the scattering plate 26, the prism sheet 25, the prism sheet 24, the scattering plate 23, and the light guiding plate 6). For this reason, even in a case where a common potential with a predetermined frequency is applied to the common electrode 17, since there is no charging and oscillating of the insulating members (the lower-side polarization plate 15b, the scattering plate 26, the prism sheet 25, the prism sheet 24, the scattering plate 23, and the light guiding plate 6), similar effects to the first embodiment are realized, such as it being possible to reliably prevent the generation of high-frequency noise.

Fourth Embodiment

Figure 8:
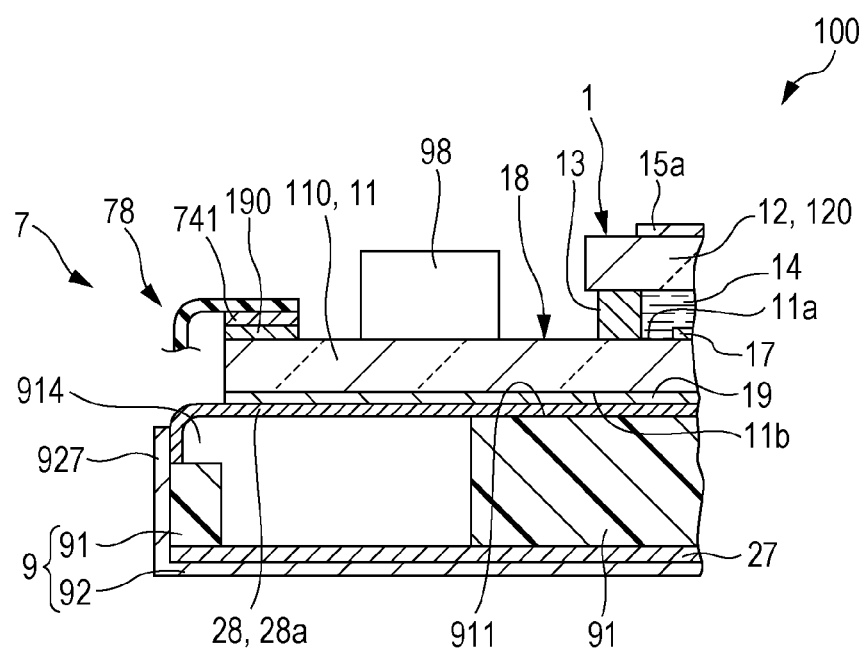
FIG. 8 is a cross-sectional diagram illustrating a connection structure of a conductive tape and a metallic case in an electro-optic device according to a fourth embodiment.

FIG. 8 is a cross-sectional diagram illustrating a connection structure of the conductive tape 28 and the metallic case 92 in an electro-optic device according to a fourth embodiment, and is equivalent to a cross-sectional diagram when the electro-optic device is cut at a position equivalent to the line IVB-IVB' of FIG. 1. In addition, since the basic configuration of the embodiment is the same as the first embodiment, the same reference numerals are attached to common parts in the diagrams and descriptions thereof will be omitted.

As shown in FIG. 8, also in the electro-optic device 100 of the embodiment, the rear-surface-side conductive layer 19, which is formed from a conductive transparent film such as an ITO film, is formed on the entire surface or substantially the entire surface of the second surface 11b of the element substrate 11 as the antistatic conductive layer. In addition, in the second surface 11b of the element substrate 11, the conductive tape 28 is adhered along three sides of the element substrate 11 with regard to the rear-surface-side conductive layer 19. Also in the embodiment, the conductive tape 28 is double-sided tape with a conductive adhesive layer formed on both surfaces of a metallic film and one surface is adhered to the rear-surface-side conductive layer 19 formed on the second surface 11b of the element substrate 11.

In the embodiment, the metallic case 92 maintains the ground potential, and a section of the side board portion 927 of the metallic case 92 has a configured where an inner side is directly exposed from the notch 914 in the resin case 91. Therefore, in the embodiment, the inner surface side of the side board portion 927 of the metallic case 92 is adhered to one surface of the conductive tape 28.

In addition, in the same manner as the first embodiment, the conductive tape 28 also carries out the function of fixing the element substrate 11 to the resin case 91, and the other surface of the conductive tape 28 is also adhered to the upper surface of the step portion 911 formed on an inner side of the resin case 91. Since the other configurations are the same as the first embodiment, descriptions thereof will be omitted.

Even in the case of such a configuration, the rear-surface-side conductive layer 19, which is formed on the entire surface or substantially the entire surface of the second surface 11b of the element substrate 11 (rear surface side of the insulating substrate 110), maintains the ground potential (constant potential) via the conductive tape 28 adhered to the rear-surface-side conductive layer 19 along the three side of the insulating substrate 110. As a result, even in a case when the sheet resistance of the rear-surface-side conductive layer 19 is high, since the conductive tape 28 is adhered over a wide range of the rear-surface-side conductive layer 19, it is possible to reliably maintain the constant potential in the entire rear-surface-side conductive layer 19. Accordingly, it is possible to reliably prevent the charging of the insulating substrate 110 and the insulating members (the lower-side polarization plate 15b, the scattering plate 26, the prism sheet 25, the prism sheet 24, the scattering plate 23, and the light guiding plate 6). For this reason, even in a case where a common potential with a predetermined frequency is applied to the common electrode 17, since there is no charging and oscillating of the insulating members (the lower-side polarization plate 15b, the scattering plate 26, the prism sheet 25, the prism sheet 24, the scattering plate 23, and the light guiding plate 6), similar effects to the first embodiment are realized such as it being possible to reliably prevent the generation of high-frequency noise.

Fifth Embodiment

Figure 9A:
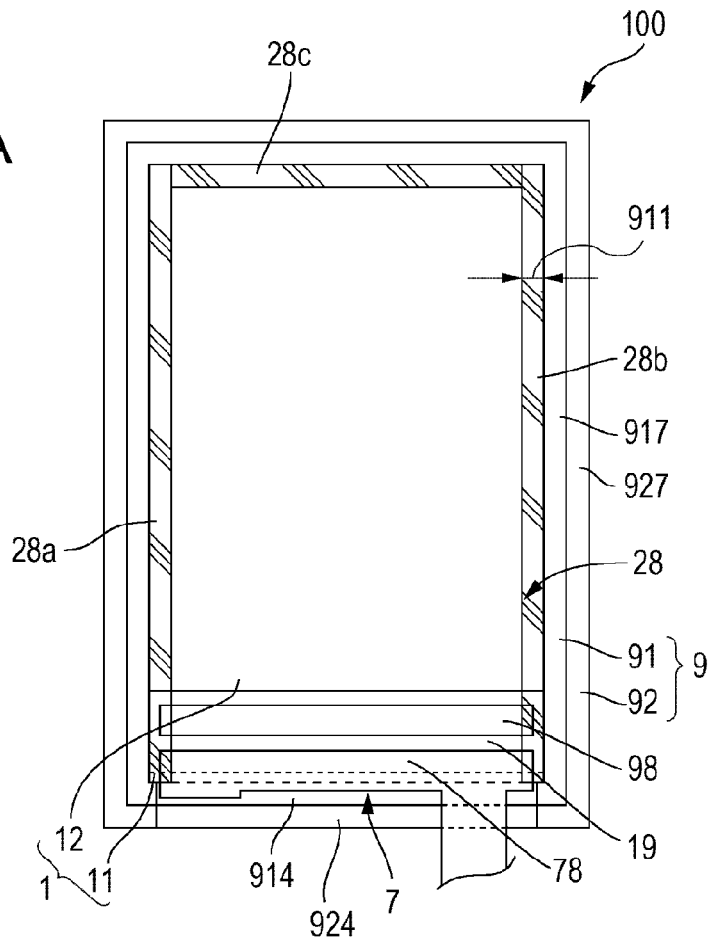
FIG. 9A is a planar diagram of an electro-optic device according to a fifth embodiment.
Figure 9B:
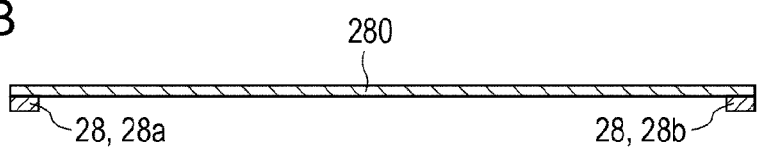
FIG. 9B is an explanatory diagram of a conductive tape before being adhered to a resin case in the electro-optic device.
Figure 9C:
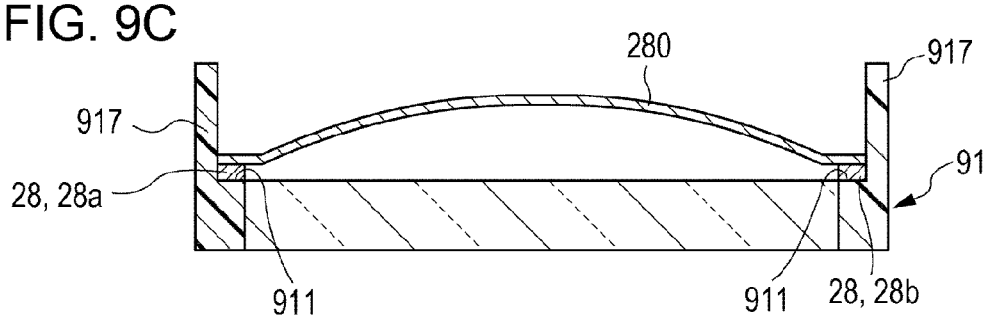
FIG. 9C is an explanatory diagram illustrating an appearance where the conductive tape is adhered to the resin case.

FIG. 9A is a planar diagram of an electro-optic device according to a fifth embodiment, FIG. 9B is an explanatory diagram of the conductive tape 28 before being adhered to the resin case 91 in the electro-optic device, and FIG. 9C is an explanatory diagram illustrating an appearance where the conductive tape 28 is adhered to the resin case 91.

In the embodiments described above, the conductive tape 28, where the three strip-shaped portions 28a, 28b, and 28c are integrally connected, is used, but as shown in FIG. 9A, with regard to the conductive tape 28, the strip-shaped portions, where are the three strip-shaped portions 28a, 28b, and 28c adhered to three sides of the element substrate 11 are adjacent, are separated from each other.

In the embodiment, in adhering the strip-shaped portions 28a and 28b of the conductive tape 28 on the step portions 911 which are relatively opposed in the resin case 91, as shown in FIG. 9B, the conductive tape 28, where the strip-shaped portions 28a and 28b are supported by both edges of a peeling sheet 280 (protective sheet) where the opposing distance of the step portions 911 which are relatively opposed is long, is prepared. Then, as shown in FIG. 9C, after the peeling sheet 280 is bent, both side portions of the peeling sheet 280 abut against the side board portions 917 on the step portions 911 to match the positioning, and the strip-shaped portions 28a and 28b are adhered to the upper surfaces of the step portions 911, the peeling sheet 280 is removed. With such a configuration, it is possible to easily adhere the strip-shaped portions 28a and 28b on the upper surfaces of the step portions 911 with high positional precision.

In addition, while omitted from the diagram, the strip-shaped portion 28c may be adhered in the state of being supported by the peeling sheet 280 in the same manner as the strip-shaped portions 28a and 28b. At that time, if an edge portion of the peeling sheet 280 where the strip-shaped portion 28c is positioned abuts against the side board portion 917 on the step portion 911 to match the positioning, it is possible to also easily adhere the strip-shaped portions 28c to the upper surface of the step portion 911 with high positional precision.

Here, if it is a state where the edge portions of the strip-shaped portions 28a and 28c partially overlap and the edge portions of the strip-shaped portions 28b and 28c partially overlap, similar effects are realized to the case of using the conductive tape 28 where the strip-shaped portions 28a, 28b, and 28c are integrally connected.

On the other hand, even if there are gaps between the edge portions of the strip-shaped portions 28a and 28c and the edge portions of the strip-shaped portions 28b and 28c, if the sheet resistance of the strip-shaped portions 28a, 28b, and 28c is set to be lower than the sheet resistance of the rear-surface-side conductive layer 19, substantially similar effects are realized to the case of using the conductive tape 28 where the strip-shaped portions 28a, 28b, and 28c are integrally connected.

Other Embodiments

In the embodiments described above, the rear-surface-side conductive layer 19 maintains the ground potential via the conductive tape 28, but a constant potential other than the ground potential may be maintained. In this case, if a constant potential used in the electro-optic device 100 is used, there is an advantage in that it is not necessary to separately provide a power source circuit.

In the embodiments described above, the rear-surface-side conductive layer 19 is adhered along three sides of the element substrate 11, but if the conductive tape 28 is adhered along one side or two sides, it is possible to prevent charging.

In the embodiments described above, double-sided tape, where a conductive adhesive layer is formed on both sides, is used, but in the case of the configuration shown in FIG. 6 or the configuration shown in FIG. 8, only conductivity on one surface side of the conductive tape 28 is used. In such a case, double-sided tape, where the conductive adhesive layer is formed only on one surface and an insulating adhesive layer is formed on the other surface, may be used.

In addition, in the case of the configuration shown in FIG. 6 or the configuration shown in FIG. 8, since only conductivity on one surface side of the conductive tape 28 is used, one-sided tape, where the conductive adhesive layer is formed only on one surface and an adhesive layer is not formed on the other surface, is used, and with regard to the adhesion of the element substrate 11 and the resin case 91, double-sided tape which is not provided with a conductive adhesive layer may be inserted between the conductive tape and the resin case 91.

In the embodiments described above, the conductive tape 28 carries out the function of adhering the element substrate 11 and the resin case 91, but the element substrate 11 and the optical sheets may be adhered by the conductive tape 28.

In the embodiments described above, an example is described where the liquid crystal panel 1 where the liquid crystal 14 is driven by the IPS method or the FFS method is used. However, the invention may be applied to an electro-optic device 100 which uses the liquid crystal panel 1 where the liquid crystal 14 is driven by a TN (Twisted Nematic) method, an ECB (Electrically Controlled Birefringence) method or a VAN (Vertical Aligned Nematic) method. Even in such a case, out of the element substrate 11 and the opposing substrate 12, in a case where the opposing substrate 12, where the common electrode is formed, is positioned on the illumination device 8 side, when a common potential with a predetermined frequency is applied to the common electrode, high-frequency noise due to static charge is generated as described in the embodiments described above, but if the invention is applied, it is possible to prevent the generation of the high-frequency noise.

In the embodiments described above, an example is described where the invention is applied to the electro-optic device 100 which uses the liquid crystal panel 1. However, in the electro-optic device such as an organic electroluminescent device or an image sensor, the present application may be applied with an aim of preventing the effect of static charge in the electro-optic device where the insulating members are arranged on a side opposite to the side where the pixel electrode and the wiring are arranged.

Example of Mounting in Electronic Apparatus

Figure 10A:
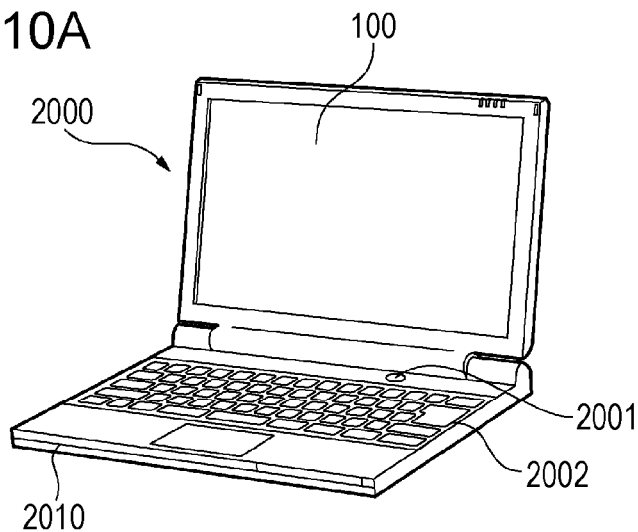
FIGS. 10A to 10C are explanatory diagrams of electronic apparatuses using a display device with an input function according to an embodiment.
Figure 10B:
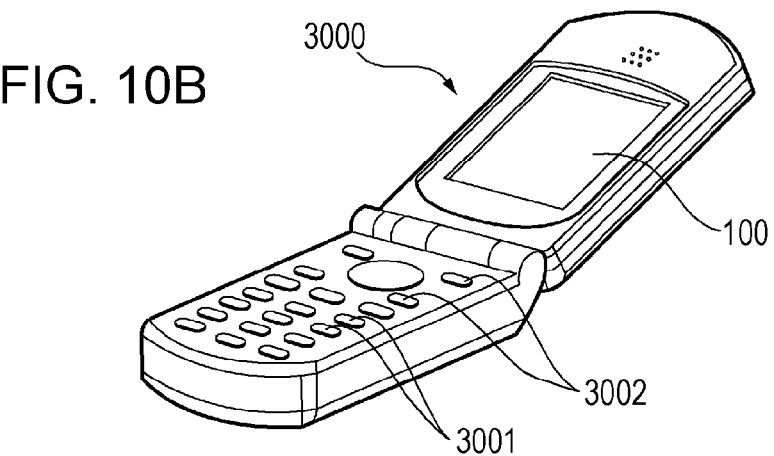
Figure 10C:
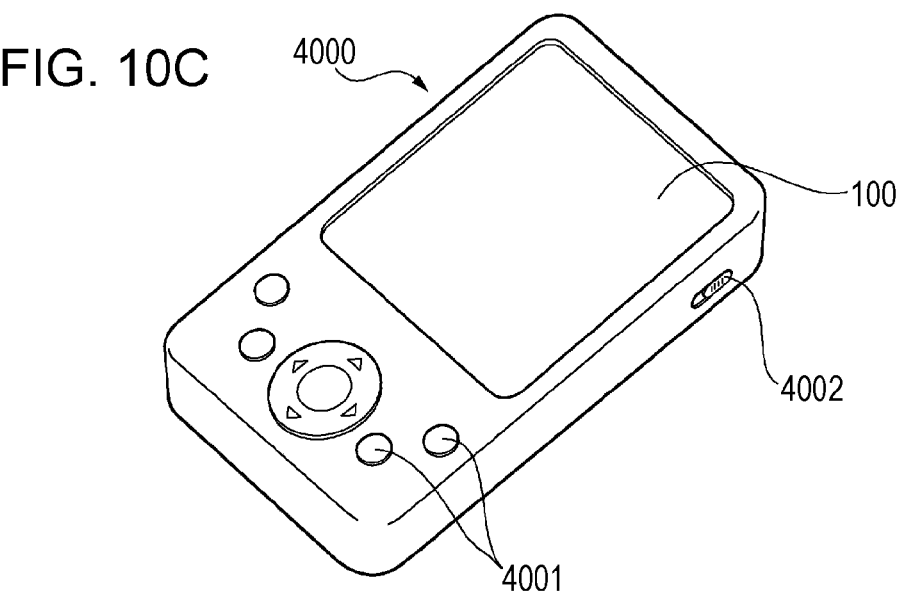

Next, an electronic apparatus applied with the electro-optic device 100 according to the embodiments described above will be described. In FIG. 10A, a configuration of a portable personal computer provided with the electro-optic device 100 is shown. A personal computer 2000 is provided with the electro-optic device 100 as a display unit and a body portion 2010. In the body portion 2010, a power switch 2001 and a keyboard 2002 are provided. In FIG. 10B, a configuration of a mobile phone device provided with the electro-optic device 100 is shown. A mobile phone device 3000 is provided with a plurality of operation buttons 3001, a scroll button 3002 and the electro-optic device 100 as a display unit. By operating the scroll button 3002, a screen displayed on the electro-optic device 100 is scrolled. In FIG. 10C, a configuration of a portable information terminal (PDA: Personal Digital Assistant) applied with the electro-optic device 100 is shown. A portable information terminal 4000 is provided with a plurality of operation buttons 4001, a power switch 4002 and the electro-optic device 100 as a display unit. When the power switch 4002 is operated, a variety of information, such as an address list or a schedule planner, is displayed on the electro-optic device 100.

In addition, as the electronic apparatus applied with the electro-optic device 100, as well as the electronic apparatuses shown in FIG. 10, there are electronic apparatuses such as a digital still camera, a liquid crystal television, a view finder-type or a monitor direct-type video tape recorder, a car navigation device, a pager, an electronic notebook, a calculator, a word processor, a work station, a TV phone, a POS terminal, and a banking terminal. In addition, as display portions of the various types of electronic apparatuses, it is possible to apply the electro-optic device 100 described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electro-optic device comprising:
   a first insulating substrate on a first surface of which a pixel electrode and a signal line are arranged;
   a conductive layer formed on a second surface of the first insulating substrate;
   a conductive tape adhered to the conductive layer along at least one side of the first insulating substrate;
   a second insulating substrate which is arranged to face the first surface of the first insulating substrate;
   a liquid crystal held between the first insulating substrate and the second insulating substrate;
   an insulating member arranged to face the second surface of the first insulating substrate; and
   a support body which supports the first insulating substrate,
   wherein the insulating member includes a light guiding plate of a backlight device and an optical sheet arranged between the light guiding plate and the first insulating substrate,
   the conductive tape is a double-sided tape on at least one surface of which a conductive adhesion layer is formed,
   the first insulating substrate and the support body are fixed by the conductive tape, and
   the conductive layer is in direct contact with the conductive tape and maintains a constant potential via the conductive tape.

2. The electro-optic device according to claim 1,
   wherein the support body includes a metallic case, and
   the conductive tape is adhered to the metallic case.

3. The electro-optic device according to claim 1,
   wherein the conductive tape is adhered along at least the one side of the first insulating substrate and another side of the first insulating substrate.

4. The electro-optic device according to claim 3,
   wherein the one side and the other side are adjacent, and the conductive tape along the one side and the conductive tape along the other side are separated.

5. The electro-optic device according to claim 1, further comprising:
   a wiring substrate connected to the first insulating substrate,
   wherein a ground pattern is formed in the wiring substrate, and
   the conductive tape is adhered to the ground pattern.

6. An electronic apparatus comprising
   the electro-optic device according to claim 1.

7. The electro-optic device according to claim 1,
   wherein the conductive tape includes a metallic tape on at least one surface of which the conductive adhesion layer is formed.

8. The electro-optic device according to claim 7,
   wherein the metallic film includes at least one of copper, nickel, stainless steel, aluminum, and an alloy thereof.

* * * * *